(12) United States Patent
Tsai et al.

(10) Patent No.: US 8,336,358 B2
(45) Date of Patent: Dec. 25, 2012

(54) WIRE STRETCHING DEVICE

(75) Inventors: Yao-Chou Tsai, Hsinchu (TW);
Kai-Cheng Chuang, Hsinchu (TW);
Sung-Hui Huang, Hsinchu (TW);
Tzu-Ming Wang, Hsinchu (TW)

(73) Assignee: E Ink Holdings Inc., Hsinchu County (TW)

(*) Notice: Subject to any disclaimer, the term of this patent is extended or adjusted under 35 U.S.C. 154(b) by 591 days.

(21) Appl. No.: 12/504,345

(22) Filed: Jul. 16, 2009

(65) Prior Publication Data
US 2010/0269951 A1   Oct. 28, 2010

(30) Foreign Application Priority Data
Apr. 22, 2009 (TW) ................. 98113299 A

(51) Int. Cl.
*B21D 11/02* (2006.01)
*B21B 25/00* (2006.01)
*B21F 33/00* (2006.01)
(52) U.S. Cl. .................. 72/302; 140/123.5; 140/108
(58) Field of Classification Search .............. 140/123.5, 140/92.1, 92 R, 102, 108, 109; 72/302, 301, 72/295, 371, 296, 297, 441, 446
See application file for complete search history.

(56) References Cited

U.S. PATENT DOCUMENTS

| | | | | |
|---|---|---|---|---|
| 5,222,384 A | * | 6/1993 | Evans | 72/301 |
| 5,606,886 A | * | 3/1997 | Polen | 72/296 |
| 2009/0308127 A1 | * | 12/2009 | Buta | 72/297 |

FOREIGN PATENT DOCUMENTS
TW           578590          3/2004

* cited by examiner

*Primary Examiner* — Dana Ross
*Assistant Examiner* — Mohammad I Yusuf
(74) *Attorney, Agent, or Firm* — Patterson Thuente Christensen Pedersen, P.A.

(57) ABSTRACT

A wire stretching device for applying a drag force onto a wire wound around an object is provided. The wire stretching device comprises a primary platform, a first sub-platform, a second sub-platform and a driving device. The primary platform comprises a plate, a fixed stick and a track, wherein the fixed stick and the track are disposed on a surface of the plate, and the fixed stick has a first fixing device for fixing a first end of the wire. The object is fixed on a first stage of the first sub-platform, and a second fixing device is disposed on a second stage of the second sub-platform for fixing the second end of the wire. The second sub-platform is moved by the driving device for adjusting the tension of the wire. The first sub-platform is passively moved along the track corresponding to the tension of the wire.

11 Claims, 4 Drawing Sheets

WIRE STRETCHING DEVICE

This application claims priority to Taiwan Patent Application No. 098113299 filed on Apr. 22, 2009, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a wire stretching device, and more particularly, to a wire stretching device for use in producing a force sensitive touch panel.

2. Descriptions of the Related Art

With the development of science and technology, high-tech products have improved interactivities with users. For example, in the modern thin display sector, improved interactivity means that users can control the display directly by touching a touch panel thereof instead of through traditional peripheral devices such as keyboards or mice.

Conventional touch screens are mainly categorized into two categories: resistive touch screens and capacitive touch screens. However, the manufacturing cost of conventional touch screens are relatively high, and in addition, the sensor disposed above the panel may slightly hinder the pathways of the traveling light rays. To solve this problem, force sensitive touch panels, unlike resistive and capacitive touch panels, have been developed. As disclosed in WO2008115408, such the force sensitive touch panels mainly adopt a wire suspension system to sense touch pressure differences. The force sensitive touch panel has a remarkably lowered cost, and because the sensor is disposed below the panel, the light transparency thereof is almost not compromised. Thus, the force sensitive touch panel is particularly suitable for the reflective panel without a backlight source, which provides the force sensitive touch screens with a competitive edge in the market.

Unfortunately, the force sensitive touch panel still has several problems. For example, the periphery of the force sensitive touch panel needs to be wired to secure the sensor. If, during the wire stretching process, the wire is tangled to cause an uneven tension distribution in the wire, a pre-pressure will remain in the wire of the force sensitive touch panel, which may cause operational errors or an insensitive touch panel. In view of this, it is highly desirable to provide a wire stretching device capable of distributing the tension evenly in a wire to avoid tangling and uneven tension distribution.

SUMMARY OF THE INVENTION

The primary objective of the present invention is to provide a wire stretching device used in the wire stretching process for producing a force sensitive touch panel. The wire stretching device can provide even tension distribution in a wire to avoid wire tangling which would otherwise compromise the operational precision of the force sensitive touch panel.

The present invention discloses a wire stretching device for applying a drag force onto a wire wound around an object, comprising a primary platform, a first sub-platform, a second sub-platform and a driving device. The primary platform comprises a plate, a fixed stick and a track, wherein the fixed stick and the track are disposed on a surface of the plate. The fixed stick has a first fixing device for fixing a first end of the wire. The first sub-platform has a first stage and a first connecting element disposed below the first stage, wherein the object is fixed on the first stage, and the first connecting element is adapted to be encircled onto the track so that the first sub-platform is adapted to slide along the track. The second sub-platform has a second stage, a second connecting element disposed below the second stage, and a second fixing device disposed on the second stage. The second fixing device is adapted to fix a second end of the wire, while the second connecting element is adapted to be encircled onto the track so that the second sub-platform is adapted to slide along the track. The driving device is adapted to drive the second sub-platform that moves along the track for adjusting the tension of the wire. Thus, the first sub-platform can slide along the track according to the tension of the wire to balance the tension between the high tension wire segment and low tension wire segment, thereby preventing wire tangling.

Another objective of the present invention is to provide a wire stretching method for use in a force sensitive touch panel, which provides a wire with even tension distribution in the force sensitive touch panel to ensure the operational precision of the touch panel.

The wire stretching method of the present invention comprises the following steps: a) providing a horizontally movable platform for loading the force sensitive touch panel fixedly on the horizontally movable platform; b) fixing two opposite ends of a wire of the force sensitive touch panel onto a first fixing device and a second fixing device individually; c) adjusting the vertical height of the first fixing device and the second fixing device individually for the wire fixed between the first fixing device and the second fixing device kept in a horizontal plane; and d) moving the second fixing device horizontally for adjusting the tension of the wire so that the horizontally movable platform is shifted horizontally correspondingly to the tension of the wire.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
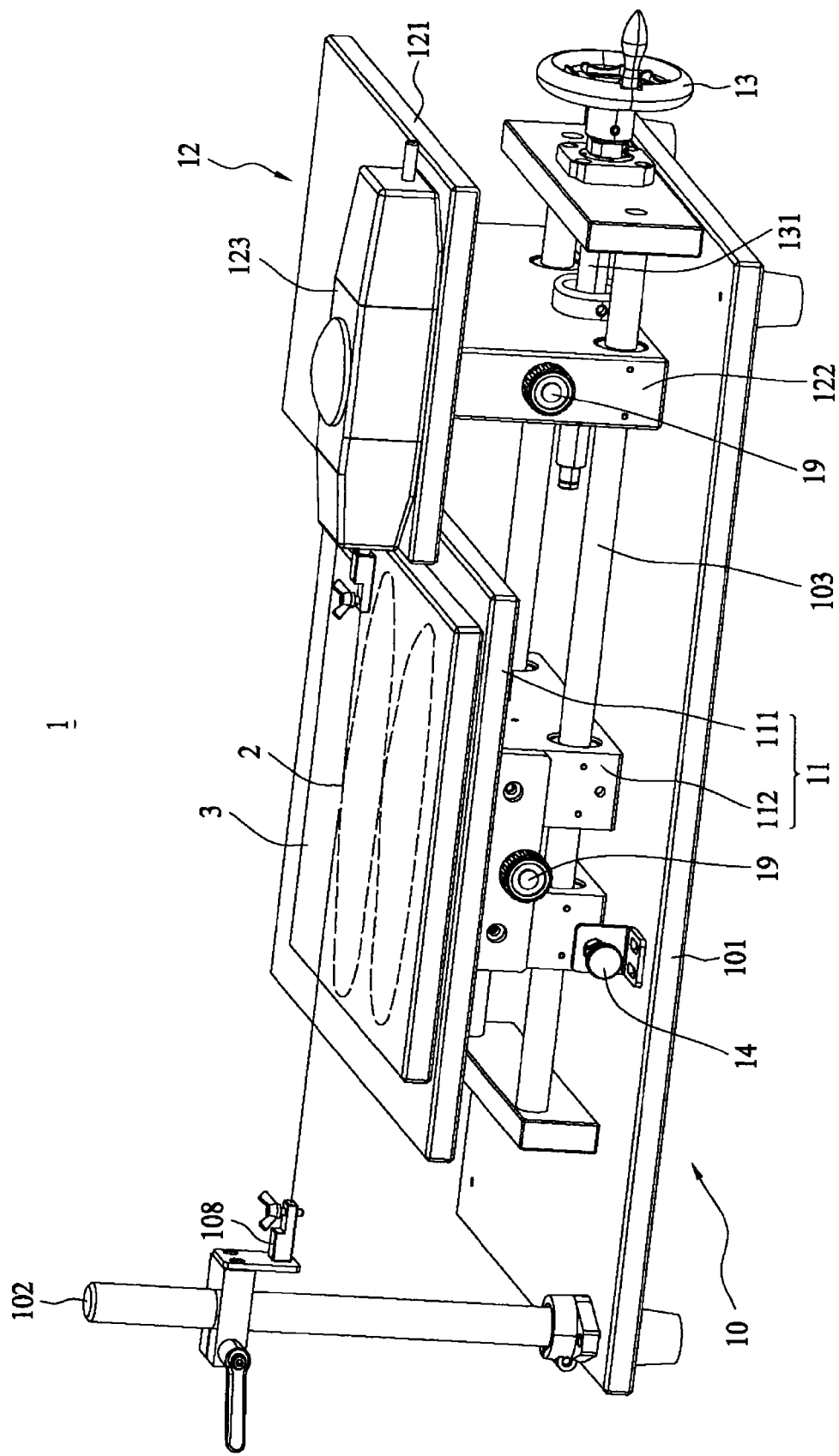
FIG. 1 is a perspective view of a wire stretching device according to the present invention.
Figure 2:
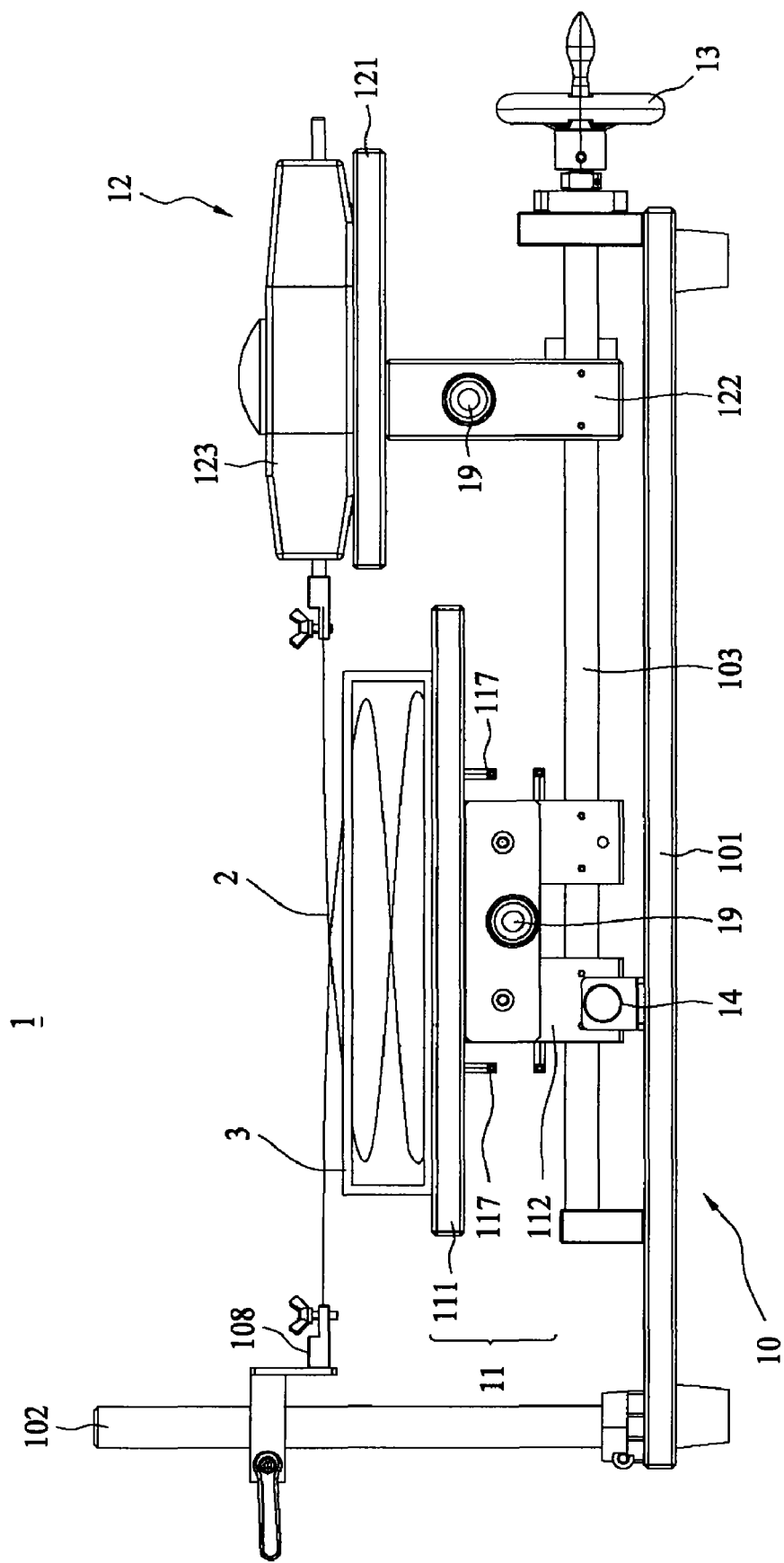
FIG. 2 is a front view of the wire stretching device according to the present invention.

In reference to FIGS. 1 and 2, a wire stretching device 1 is provided by the present invention to apply a drag force onto a wire 2 wound around an object 3. The object 3 may be a force sensitive touch panel. The wire stretching device 1 comprises a primary platform 10, a first sub-platform 11, a second sub-platform 12 and a driving device 13. The primary platform 10 comprises a plate 101, a fixed stick 102 and a track 103. The fixed stick 102 and the track 103 are disposed on the surface of the plate 101. The fixed stick 102 of the primary platform 10 has a first fixing device 108 for fixing the first end of the wire 2 and is adapted to slide along the fixed stick 102 for adjusting the height.

In reference to FIG. 2, the first sub-platform 11 has a first stage 111, two holding devices 117, and a first connecting element 112 disposed below the first stage 111. The first connecting element 112 is adapted to be encircled onto the track 103. The contact surfaces between the first connecting element 112 and the track 103 are smooth with a low friction coefficient so that the first sub-platform 11 can move easily and smoothly along the track 103 when an external force is applied. Specifically, the first stage 111 is a platform for loading the object 3 to be wound with the wire 2, and the two holding devices 117 are disposed on the first stage 111 to hold the object 3 on the first stage 111. The first connecting element 112 has an adjustable flexed structure 19 which is, for example but not limited to, an adjustable vertical screw rod assembly or an adjustable vertical connecting rod assembly for adjusting the height of the first stage 111 along the vertical direction. It should be noted that the numbers of the holding devices and the first connecting elements are provided herein only as an example, but not to limit the present invention.

In reference to FIG. 1, the second sub-platform 12 has a second stage 121, a second connecting element 122 disposed below the second stage 121 and a second fixing device 123 disposed on the second stage 121. More specifically, the second stage 121 is also a platform, on which the second fixing device 123 may be a tension meter disposed on the second stage 121. A second end of the wire 2 is fixed at a holding end of the tension meter for calculating the tension of the wire 2. The second connecting element 122 is adapted to be encircled onto the track 103, and the contact surfaces between the second connecting element 122 and the track 103 are smooth with a low friction coefficient so that the second sub-platform 12 can slide along the track 103 easily when the driving device 13 is actuated. Similarly, the second connecting element 122 has an adjustable flexed structure 19 adapted to vertically adjust the height of the second stage 121. The adjustable flexed structure may be, for example, an adjustable vertical screw rod assembly or an adjustable vertical connecting rod assembly, but is not merely limited thereto.

It should be appreciated that the first fixing device 108 on the fixed stick 102 and the second fixing device 123 on the second stage 121 are substantially parallel to the track 103. Therefore, the wire 2 whose two ends are fixed at the first fixing device 108 and the second fixing device 123 respectively is also substantially parallel to the track 103. With this arrangement, the wire tension read on the tension meter is substantially equal to the actual tension of the wire 2, which complies with the practical operational requirement of the force sensitive touch panel.

The second sub-platform 12 further comprises a connecting piece 131 for connecting the driving device 13 and the second connecting element 122 so that the second sub-platform 12 can slide along the track 103 according to the movement of the driving device 13 to adjust the tension of the wire 2. More specifically, the driving device 13 may be a screw revolving wheel which can be rotated manually or operated electrically by the user to control the horizontal movement of the second sub-platform 12 on the track 103. Thus, the tension of the wire 2 whose two ends are fixed at the first fixing device 108 and the second fixing device 123 respectively can have its tension increased or decreased with the horizontal movement of the second sub-platform 12 until the tension of the wire 2 reaches a predefined value.

As described above, the present invention is characterized in that the first sub-platform 11 can slide along the track 103 easily when actuated by an external force. Thus, when the object 3 wound with the wire 2 is fixed on the first stage 111 and the tension of the wire 2 around the object 3 is increased or decreased in response to the movement of the driving device 13, the tension difference between the two ends of the wire 2 draws the object 3 to move along the track 103 and thus draws the first sub-platform 11 that holds the object 3 along the direction of the track 103 until the tension of the wire 2 wound around the object 3 is balanced between the two ends. Then, the first sub-platform 11 stops the movement on the track 103. In this way, an even tension is achieved in the wire 2.

In reference again to FIG. 2, the first connecting element 112 and the second connecting element 122 utilize the adjustable flexed structure 19 to adjust the vertical height of the first stage 111 and the second stage 121 according to the height of the wire 2 fixed between the first fixing device 108 and the second fixing device 123. As a result, the two opposite ends of the wire 2 fixed at the first fixing device 108 and the second fixing device 123 are kept at the same height, thereby to ensure that the tension read on the tension meter is substantially equal to the actual wire tension.

In the preferred embodiment of the present invention, the wire stretching device 1 of the present invention further comprises a stopping device 14. As described above, when a drag force is applied to the wire 2, the object 3 on the first sub-platform 11 moves along the horizontal direction accordingly. Once the object 3 moves to a balance position on the track 3, the stopping device 14 is adapted to fix the first sub-platform 11. More specifically, the stopping device 14 has a tongue for fixedly connecting the first connecting element 112 and the plate 101, thereby preventing the first connecting element 112 from sliding along the track 103. It should be noted that other fixing mechanisms can be used subsequently to fix the wire 2 around the object 3 and the wire 2 can be cut into a desired length as required by the object 3, which is not directly related to the present invention and will not be further described herein.

In references to FIGS. 1 to 4, the present invention also provides a wire stretching method for use in a force sensitive touch panel. In step 41, a horizontally movable platform is provided for loading an object 3 fixedly thereon. In the embodiment as shown in the figures, the horizontally movable platform is the first sub-platform 11, while the object 3 is a force sensitive touch panel. As described previously, the force sensitive touch panel is fixedly loaded on the first sub-platform 11 by two holding devices 117. In this step, a wire 2 is wound, preferably, double wound (see FIG. 3B), around and passes through the force sensitive touch panel. Other winding methods can also be used and the present invention is not limited to what is described herein.

Then, in step 42, the two opposite ends of the wire 2 in the force sensitive touch panel are fixed to a first fixing device 108 and second fixing device 123 respectively. Afterwards, in step 43, the first fixing device 108 and the second fixing device 123 are adjusted vertically so that the wire 2 fixed therebetween is kept at the same horizontal level. In step 44, the second fixing device 123 is moved horizontally to adjust the tension of the wire 2 and consequently, the horizontally movable platform moves horizontally according to the tension of the wire 2 until the tension is balanced between both ends of the wire 2. Then, the horizontally movable platform stops at the balanced position with the tension of the wire 2 being evenly distributed across the entire wire 2.

Figure 3A:
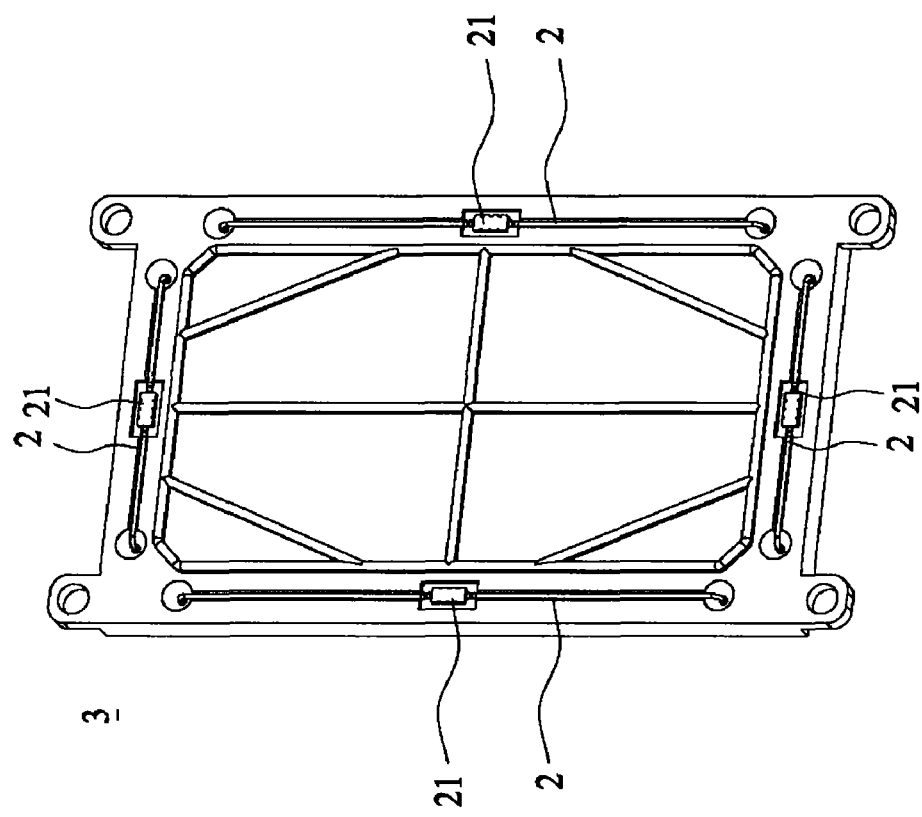
FIG. 3A is a perspective view of a force sensitive touch panel used in the wire stretching device according to the present invention.
Figure 3B:
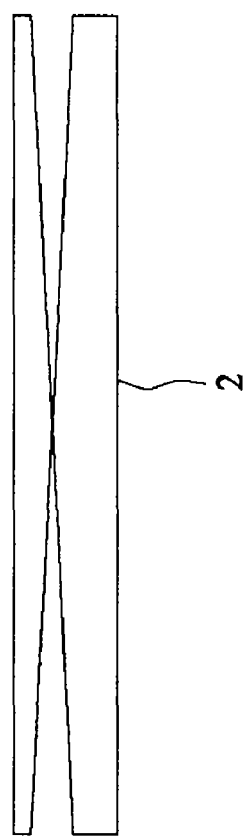
FIG. 3B shows a wire winding method used in the wire stretching device according to the present invention.
Figure 4:
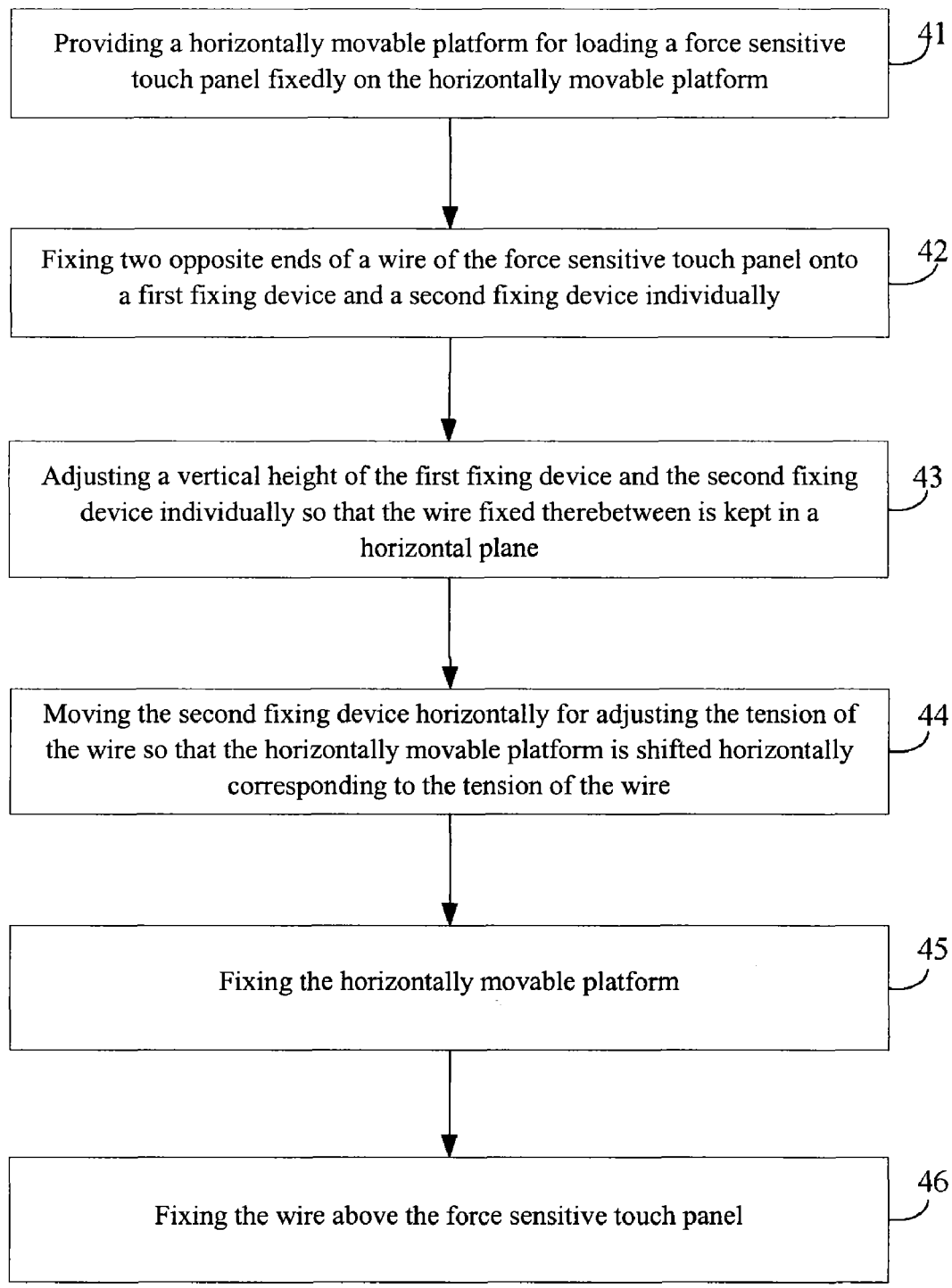
FIG. 4 is a flowchart of the wire stretching method for a force sensitive touch panel according to the present invention.

Subsequent to step 44, the wire stretching method for use in a force sensitive touch panel according to the present invention further comprises the following steps. In step 45, the horizontally movable platform is fixed by a stopping device 14 to prevent the horizontally movable platform from further moving along the horizontal direction. Then, in step 46, the wire 2 is fixed above the force sensitive touch panel. The wire 2 on the object 3 can be fixed with a clamp 21 or other suitable fixing mechanisms and be cut into a length as required by the force sensitive touch panel, which is not directly related to the present invention and thus will not be further described herein. After completion of step 46, portions of the wire 2 fixed at the first fixing device 108 and the second fixing device 123 are cut off. The force sensitive touch panel is then turned to another side, and then steps 41 through 46 are repeated so that all four sides of the force sensitive touch panel are all wired in sequence to obtain a finished product as shown in FIG. 3A.

In summary, the present invention provides a wire stretching device 1 used to wind a wire around a force sensitive touch panel to provide even tension distribution across the wire and avoid tangling of the wire. The present invention also provides a wire stretching method for use in a force sensitive touch panel, which can provide a wire with evenly distributed tension around the force sensitive touch panel, thereby providing a force sensitive touch panel with improved force sensing capability.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wire stretching device for applying a drag force onto a wire wound around an object, comprising:
   a primary platform, comprising a plate, a fixed stick and a track, the fixed stick and the track disposed on a surface of the plate, the fixed stick having a first fixing device for fixing a first end of the wire;
   a first sub-platform, having a first stage and a first connecting element disposed below the first stage, the object loaded on the first stage fixedly, the first connecting element adapted to be encircled onto the track so that the first sub-platform is adapted to slide along the track;
   a second sub-platform, having a second stage, a second connecting element disposed below the second stage, and a second fixing device disposed on the second stage, the second fixing device adapted to fix a second end of the wire, the second connecting element adapted to be encircled onto the track so that the second sub-platform is adapted to slide along the track; and
   a driving device, adapted to drive the second sub-platform moving along the track for adjusting the tension of the wire,
   wherein the first sub-platform slides along the track corresponding to the tension of the wire.

2. The wire stretching device as claimed in claim 1, wherein the wire fixed between the first fixing device and the second fixing device above the plate is parallel to the track substantially.

3. The wire stretching device as claimed in claim 1, wherein the first connecting element and the second connecting element are adjustable flexed structures.

4. The wire stretching device as claimed in claim 3, wherein the adjustable flexed structure is a vertical screw rod assembly.

5. The wire stretching device as claimed in claim 3, wherein the adjustable flexed structure is a vertical connecting rod assembly.

6. The wire stretching device as claimed in claim 1, wherein the first fixing device is height-adjustable along the fixed stick.

7. The wire stretching device as claimed in claim 1, wherein the first sub-platform further comprises a holding device for fixing the object on the first stage.

8. The wire stretching device as claimed in claim 1, wherein the driving device is a screw revolving wheel.

9. The wire stretching device as claimed in claim 1, further comprising a stopping device disposed on the surface of the plate, and the stopping device is used to restrict the first connecting element from sliding along the track.

10. The wire stretching device as claimed in claim 1, wherein the second sub-platform further comprises a tension meter disposed on the second stage and connecting with the second fixing device for measuring the tension of the wire.

11. The wire stretching device as claimed in claim 1, wherein the object is a force sensitive touch panel.

* * * * *